United States Patent [19]
Witt et al.

[11] 3,922,191
[45] Nov. 25, 1975

[54] APPARATUS FOR MOLDING ARTICLES WITH MULTIPLE BASIS WEIGHT OR THICKNESS

[75] Inventors: Edgar C. Witt, Wilbraham; Donald T. Daniele, Longmeadow, both of Mass.

[73] Assignee: Diamond International Corporation, New York, N.Y.

[22] Filed: May 23, 1974

[21] Appl. No.: 472,871

[52] U.S. Cl. ............... 162/383; 162/388; 162/391; 162/392; 162/395; 425/85; 425/271
[51] Int. Cl.² ........................................ D21J 7/00
[58] Field of Search ........... 162/228, 387, 389, 390, 162/391, 392, 395, DIG. 6, 383, 388; 425/271, 85; 264/87

[56] References Cited
UNITED STATES PATENTS

| | | | |
|---|---|---|---|
| 1,527,202 | 2/1925 | Louisot | 162/228 |
| 2,961,368 | 11/1960 | Lyons | 162/390 X |
| 3,185,615 | 5/1965 | Reifers | 162/228 |
| 3,282,774 | 11/1966 | Wells | 162/390 X |
| 3,850,793 | 11/1974 | Hornbostel et al. | 162/228 X |

Primary Examiner—S. Leon Bashore
Assistant Examiner—Richard V. Fisher
Attorney, Agent, or Firm—Karl W. Flocks

[57] ABSTRACT

Apparatus and method for molding an article of pulp or foam material with predetermined variation in weight or thickness distribution of fiber per unit in the article wherein the apparatus comprises a movable forming assembly carrying at least one forming platen unit thereon. The platen unit is pivotally mounted on a hollow shaft and includes at least one compartmented die made up of a plurality of die sections separated from each other. The die sections communicate with a source of vacuum through the hollow shaft which is controlled by a distributor and valve arrangement whereby the period of application and duration of vacuum in at least one of the die sections is less than that of other die sections to thereby effect a variation in weight distribution of fiber per unit area of the article.

12 Claims, 11 Drawing Figures

APPARATUS FOR MOLDING ARTICLES WITH MULTIPLE BASIS WEIGHT OR THICKNESS

BACKGROUND OF THE INVENTION

1. Field of the Invention

The field of the invention is believed to be best exemplified by art in Class 162/228 and Class 425/271.

2. Description of the Prior Art

This invention was developed in light of the knowledge that in pulp or like articles, such as egg cartons, certain areas of the finished articles are inherently stronger than other areas and that as a consequence the weaker areas could be strengthened by being molded at a higher basis weight or thickness of the pulp or like material.

The desideratum of multiple basis weight or thickness molded in articles have been recognized in the industry. Exemplifying prior art endeavors to carry forth the production of molded articles of this type are the Reifers U.S. Pat. Nos. 3,185,615 and 3,325,349. The Reifers U.S. Pat. No. 3,185,615 discloses the concept of molding articles in which weaker areas are made thicker than the stronger areas by using a molding screen in which relatively large areas are blocked out in a plurality of discrete small areas in a repeated geometric pattern. According to this patent, the screen may be blocked out in a number of ways such, for example, as embedding polyethylene into the screen, spraying plastic or paint-like material onto the screen through a stencil, or electroplating the screen in controlled areas.

In the Reifers U.S. Pat. No. 3,325,349, it is shown that molded articles may be made with the weaker areas thicker than the stronger areas by modifying the conventional molding dies by incorporating a perforated material having hole patterns and sizes which provide sufficient restriction to retard drainage and thereby to retard pulp deposit on the die during the dip interval.

SUMMARY OF THE INVENTION

The present invention relates generally to a new and improved apparatus and method for producing molded pulp or like articles having multiple basis weight or thickness. More specifically, this invention provides a new apparatus and method for molding articles of pulp, foam or equivalent material in which certain areas of the finished articles are of higher basis weight or thickness than that of other areas thereof.

Accordingly, it is an object of the present invention to provide an apparatus for producing a molded article in which areas of normally high strength is of less basis weight or thickness than that in other areas of the article.

It is another object of the present invention to provide an apparatus for producing a molded article in which the areas of normally lower strength are of higher basis weight or thickness than the areas of greater strength.

It is a further object of this invention to provide an apparatus for producing a molded article in which areas normally subjected to greater stress and/or loads are of higher basis weight or thickness than areas which normally sustain lesser stresses or loads.

It is another object of this invention to provide means for controlling the application and duration of vacuum in the forming cycle of a molding machine that allows two or more vacuum forming times for each forming mold.

It is further an object of this invention to provide means for effecting variation in weight or thickness distribution of fiber per unit area of a molded article.

It is still another object of this invention to minimize unnecessary stiffness of pocket section in articles as molded egg cartons, for example.

It is yet another object of this invention to effect an over-all reduction of the material required in producing molded articles whereby economy of material is achieved.

Another object of this invention is to provide a method of molding articles which have a reduced nesting interval which may be stacked in a reduced volume and will effect savings in transportion expenses.

Still another object of this invention is to provide means for selectively forming thick or thin areas with the same mold.

Yet a further object of this invention is to provide an apparatus and method for molding articles requiring less heat in rough drying due to the use of less material in complex areas of the die.

Still a further object of this invention is to provide an apparatus and method for molding articles where improved hot press operation is obtained for a given tonnage of force due to the reduction in mass in the article to be compressed.

Still another object of this invention is to provide an apparatus and method for molding articles in which improved nesting thereof is obtained at the customer's level.

With the above objects in mind, applicants have developed a new and improved apparatus and method for producing molded articles of pulp, foam or equivalent material, such as egg cartons in which such articles are of multiple basis weight or thickness in different areas thereof. A specific example of egg cartons which may be produced in accordance with the apparatus and method of the present invention is disclosed in pending U.S. application Ser. No. 465,434, filed Apr. 29, 1974 and assigned to the assignee of the instant application. Whereas the pending application mentioned above discloses a carton including a cellular tray or pocket portion having a lower basis weight or thickness compared with cover and lock flap portions, which have a higher basis weight or thickness, the present application relates to an apparatus and the method for producing such a carton. Moreover, the apparatus and method according to the present invention are adapted to produce a carton with hinge joints of relatively high basis weight or thickness.

It is to be clearly understood that the concept of the present invention may be applied in molding any article of multiple basis weight or thickness regardless of the nature or purpose of the variation in basis weight or thickness. In other words, whether the variation in basis weight or thickness is for purposes of saving material, increasing strength of selective areas, or for whatever reason, the desired variation may be carried out as disclosed herein. Still the apparatus and method, as disclosed herein, will be readily understood when considered in connection with the carton disclosed in pending application Ser. No. 465,434, mentioned above.

BRIEF DESCRIPTION OF THE DRAWINGS

Briefly referring to the accompanying drawings, it may be readily seen that the present invention is embodied in the following figures wherein.

DETAILED DESCRIPTION OF THE INVENTION

Figure 1A:
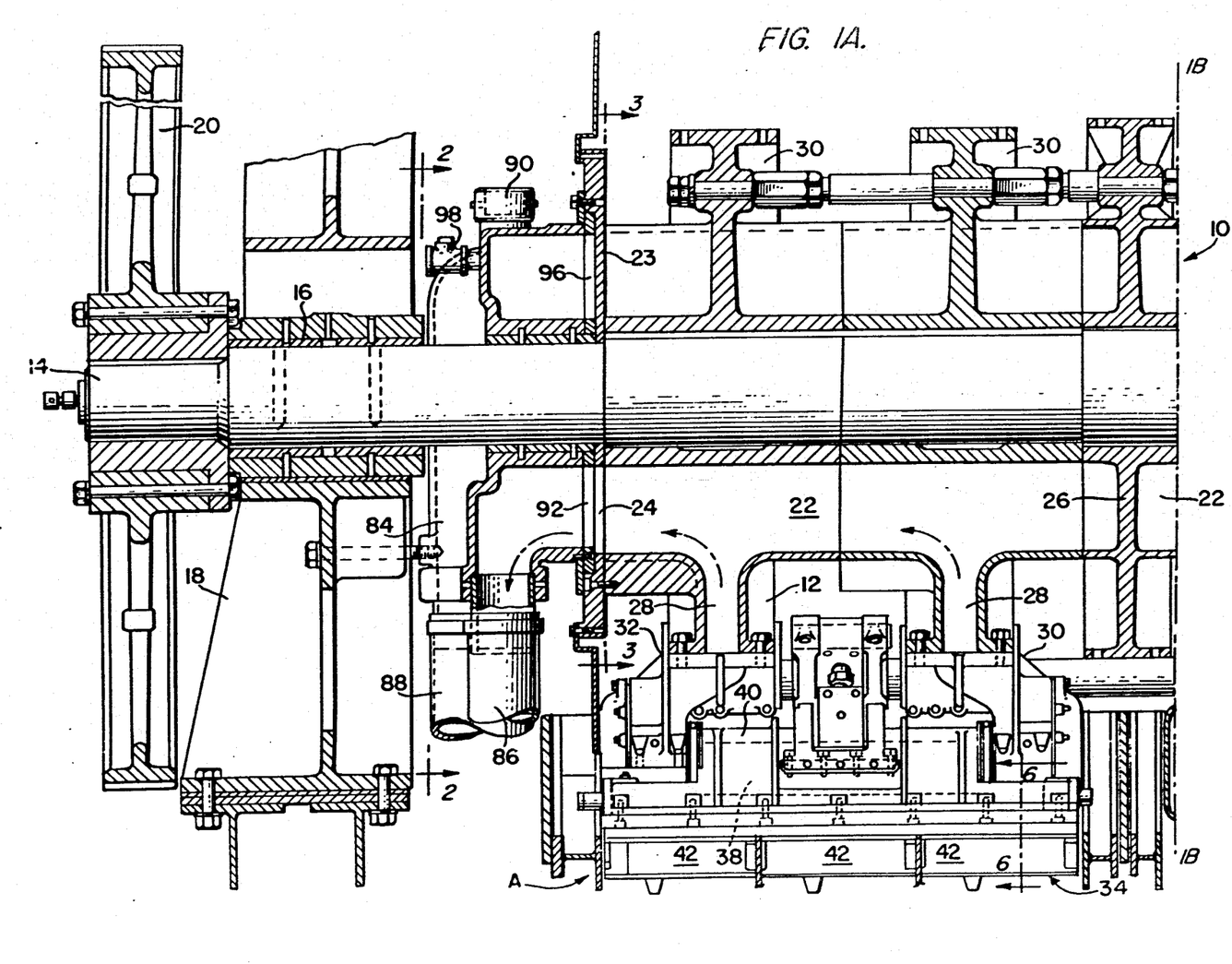
FIGS. 1A and 1B jointly represent an elevational view, partly in section of the molding apparatus according to the present invention with some duplicated portions thereof normally extending between section line 1B—1B of FIG. 1A and section line 1A—1A of FIG. 1B being omitted to conserve space.
Figure 1B:
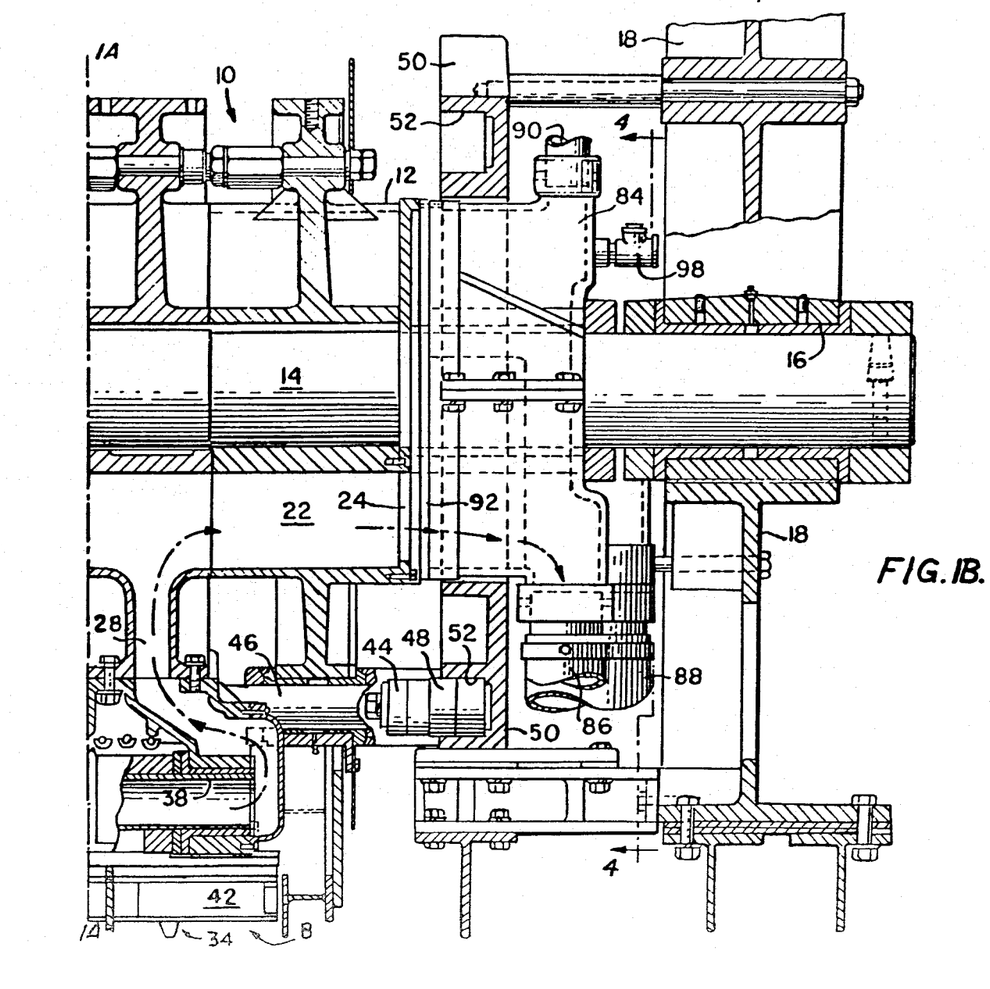
Figure 3:
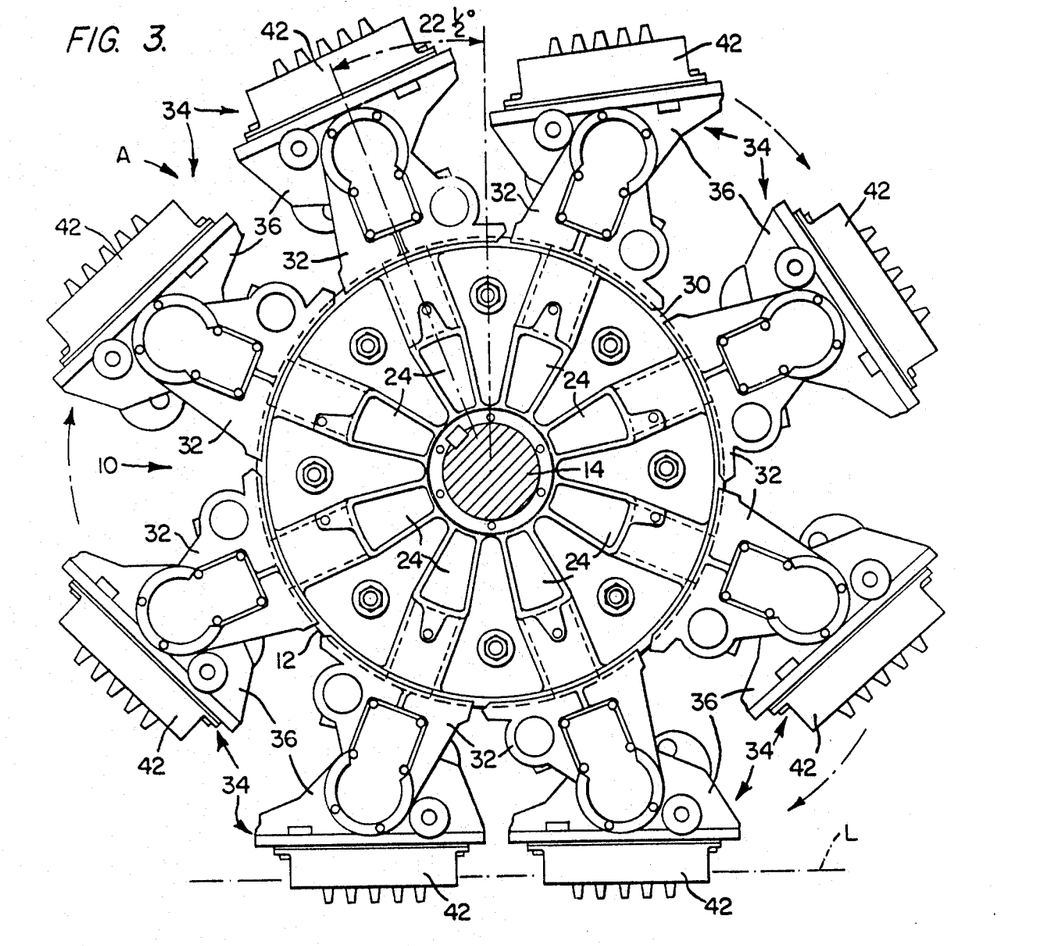
FIG. 3 is a view taken along the section line 3—3 in FIG. 1A.

Referring now to the drawings with greater particularity, it is seen in FIGS. 1A, 1B and 3 that the apparatus for forming multiple basis weight or thickness molded articles according to the present invention includes a forming cylinder assembly 10, a rotatable cylinder 12 keyed or otherwise secured to a shaft 14 journalled in bearings 16, which in turn are supported in fixed support beams 18. Shaft 14 is provided with a driven sprocket or gear 20 at one end thereof which may be driven by chain or gear means not illustrated. Cylinder 12 is provided with a plurality of axially extending chambers 22 each having an axial opening 24 at one end, an intermediate partition 26 forming a blind closure at the other end of each cylinder 22, and radially extending passages 28. Cylinder 12 is also provided with a plurality of axially spaced, circumferentially extending mounting flanges 30 on which are secured bearing units 32 for forming platen units 34. The cylinder assembly 10, as disclosed, comprises two axially spaced sets A and B of eight platen units 34 each of which is mounted on cylinder 12 on opposite sides of partition 26. Each platen unit 34 is carried 360° in a continuous repeating cycle on cylinder 12.

Each platen unit 34 includes a pivoting platen 36 mounted on a hollow pivot shaft 38 pivotally supported in bearings 40 secured on cylinder 12. Hollow shaft 38 has open ends for communication by way of passage 28, chamber 22 with a vacuum source or an air source, depending upon the portion of the forming cycle of the apparatus, and the molding die 42 attached to platen 36.

Figure 8:
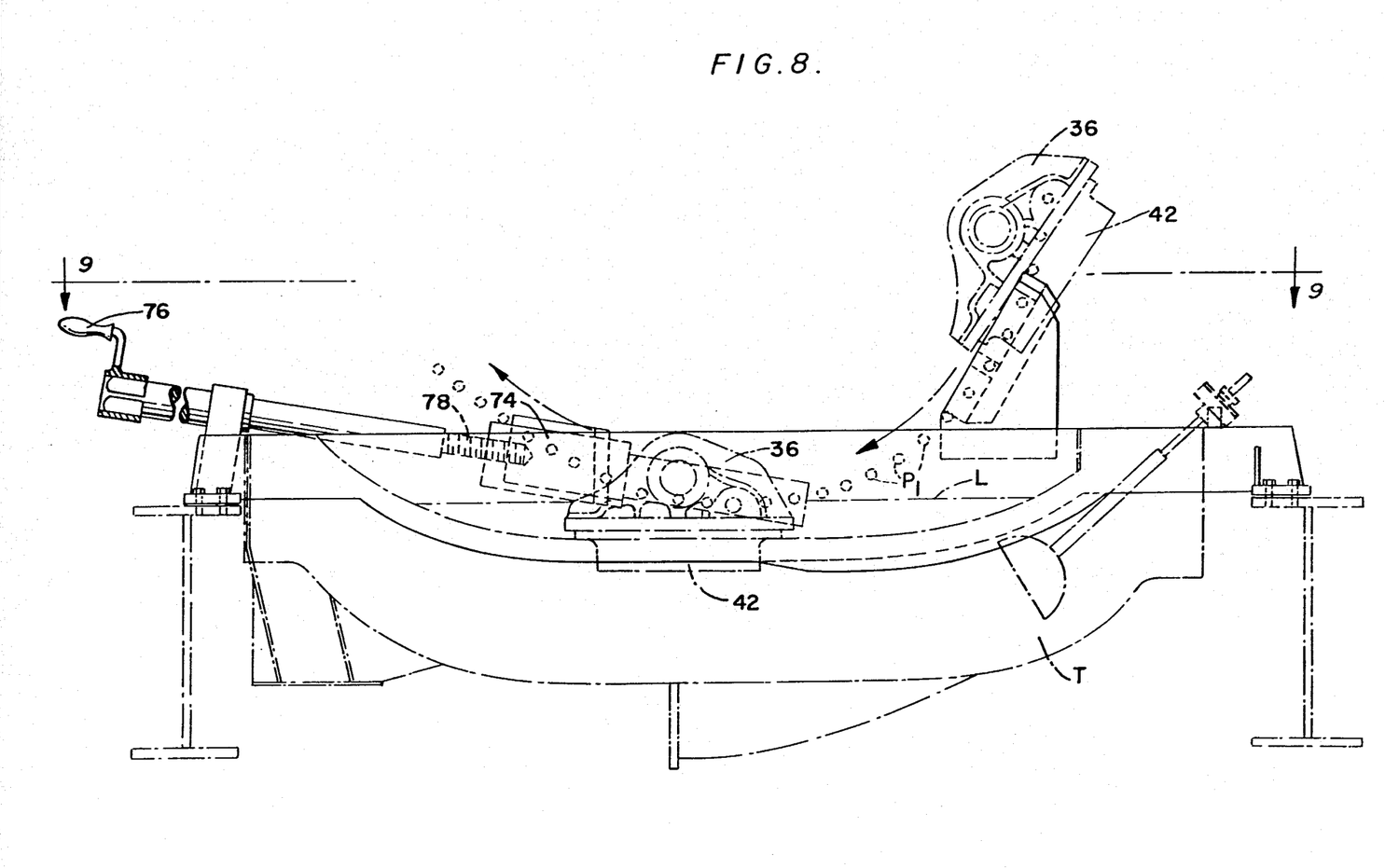
FIG. 8 represents the attitude and trajectory of a platen unit and associated parts as they pass through a vacuum forming cycle.

As mentioned above each platen unit 34 includes a pivoting platen 36. Pivoting of the platen 36 and consequently the attitude of the platen 36 is controlled by a rocker arm 44, extending from a rocker shaft 46 provided on the platen 36, and a cam follower 48 is constrained by a fixed cam 50 within a cam groove 52. As seen in FIG. 1B cam 50 is fixed to a support beam 18. The rocker arm 44, rocker shaft 46, cam follower 48, cam 50 and groove 52 are arranged to control the attitude of each platen 36 to the extent that it enters a stock tank T in a position parallel to the horizontal plane or nearly so, moves through the tank, and leaves the tank maintained in the horizontal attitude or nearly so depending upon the stock level L as seen in FIG. 8. Additionally, the rocker arm 44, rocker shaft 46, cam follower 48, cam 50 and groove 52 are arranged to control the attitude of each platen so that the molding dies 42 are directed radially outwardly so as to facilitate transfer of the molded article to a drying die, for example, which is conventional.

Figure 5:
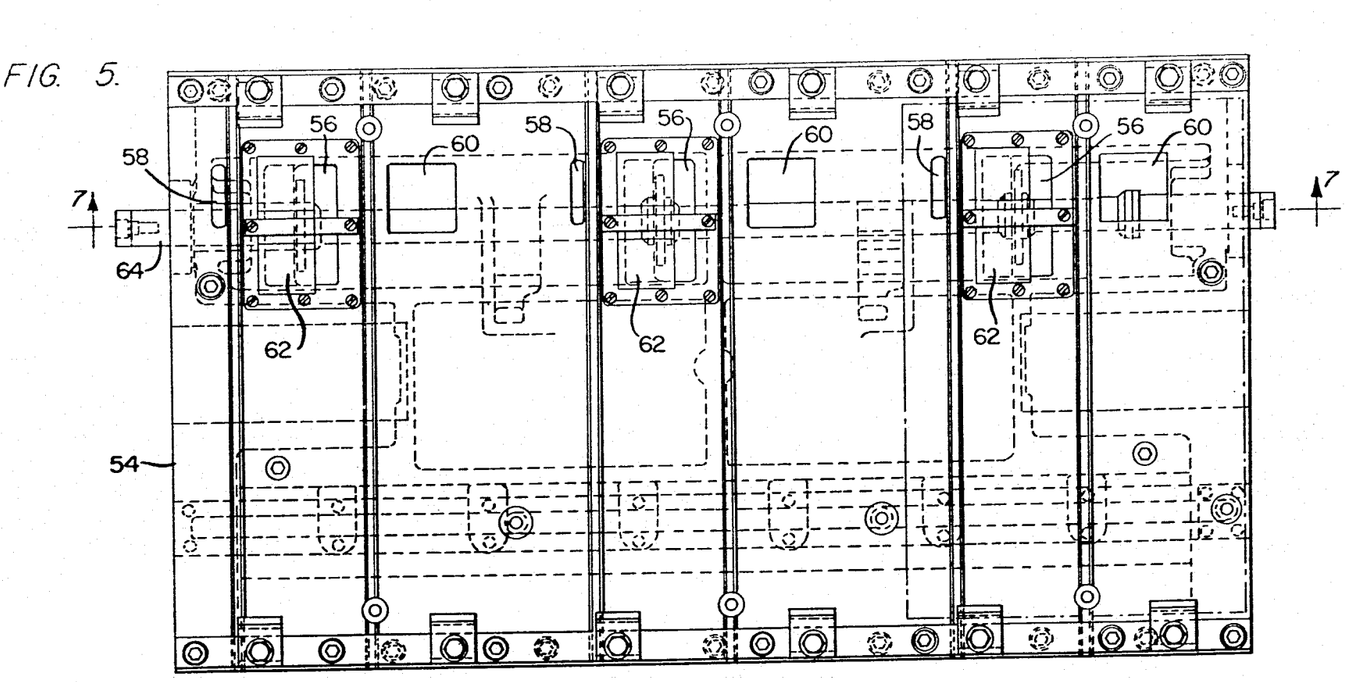
FIG. 5 is a plan view of a valving arrangement for a platen unit of the molding apparatus according to the present invention.
Figure 6:
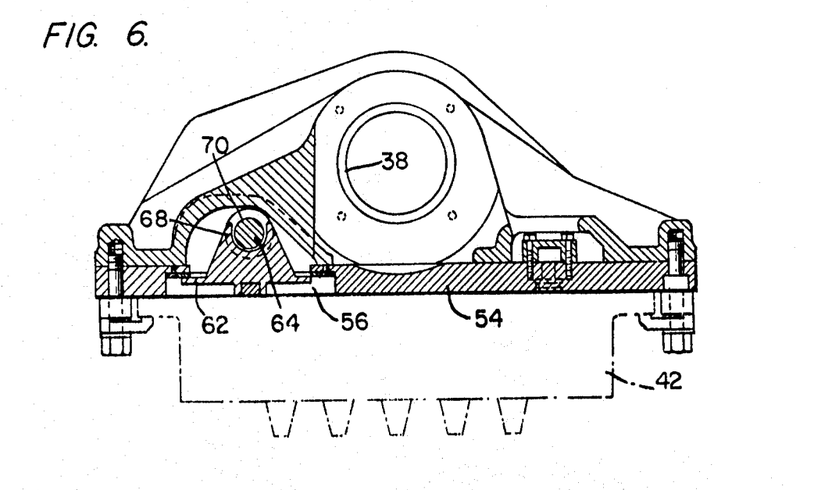
FIG. 6 is a view taken along the section line 6—6 in FIG. 1A.
Figure 7:
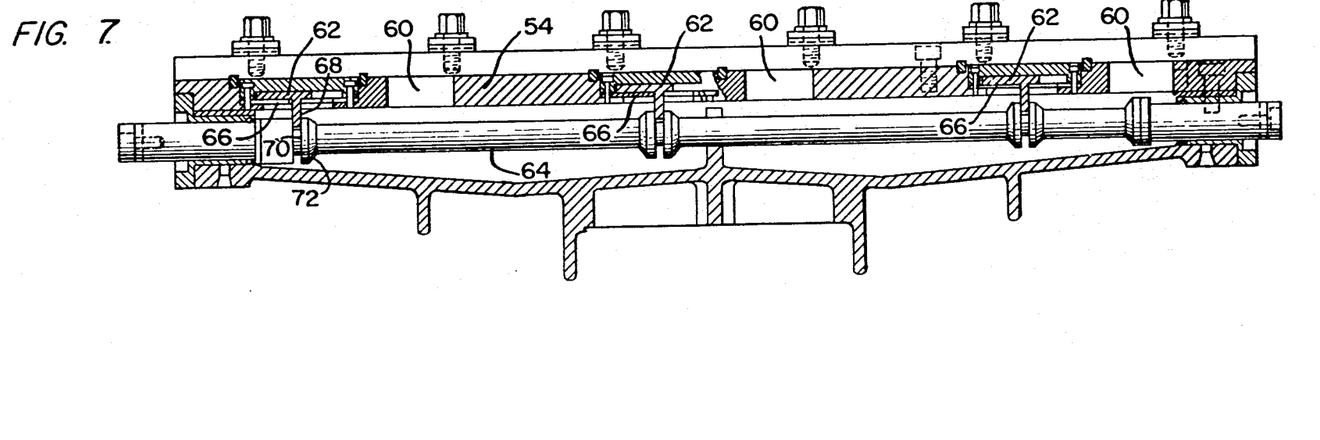
FIG. 7 is a view taken along the section line 7—7 of FIG. 5.
Figure 9:
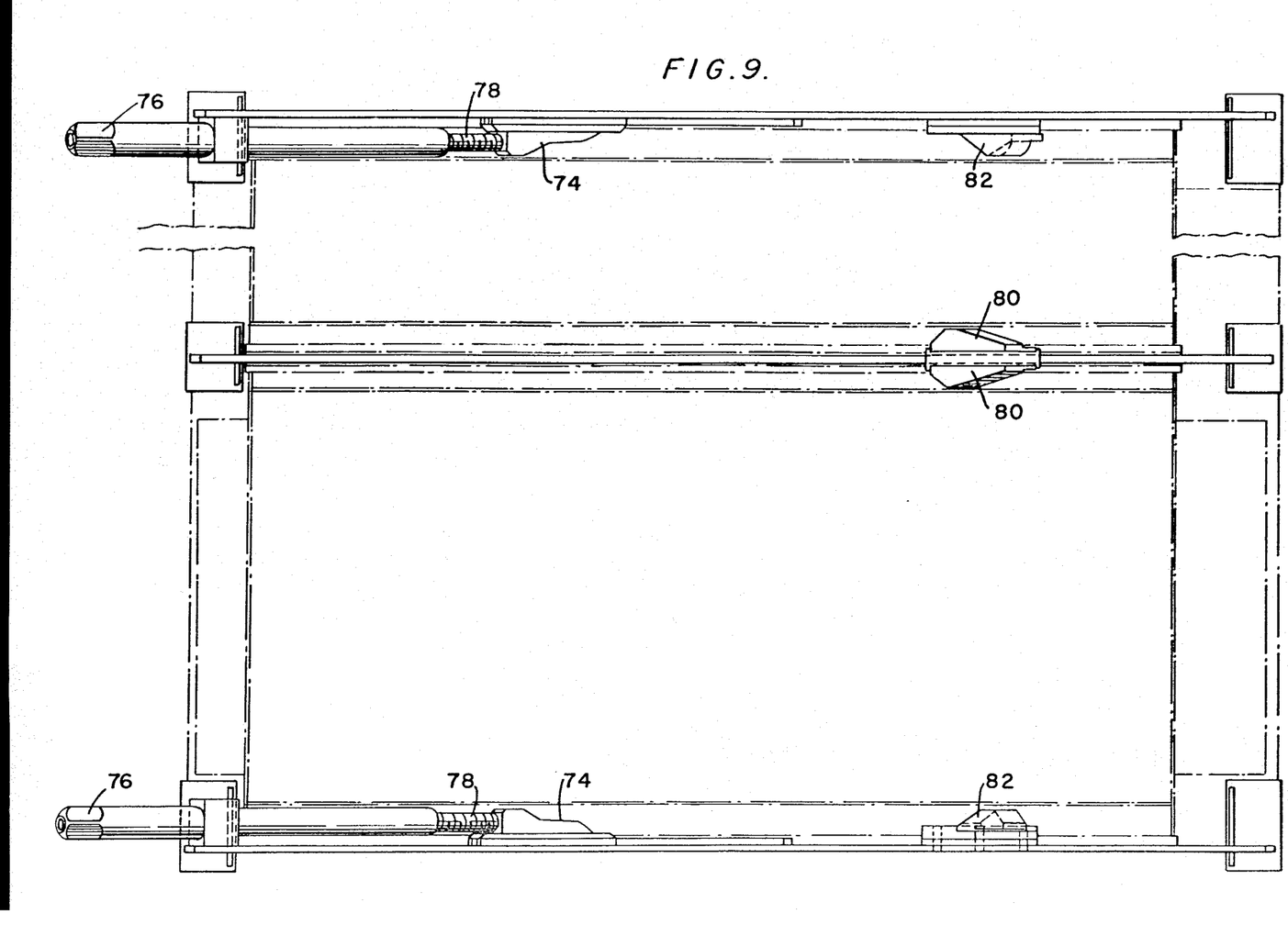
FIG. 9 is a view taken along the section line 9—9 in FIG. 8 with portions thereof broken away.
Figure 10:
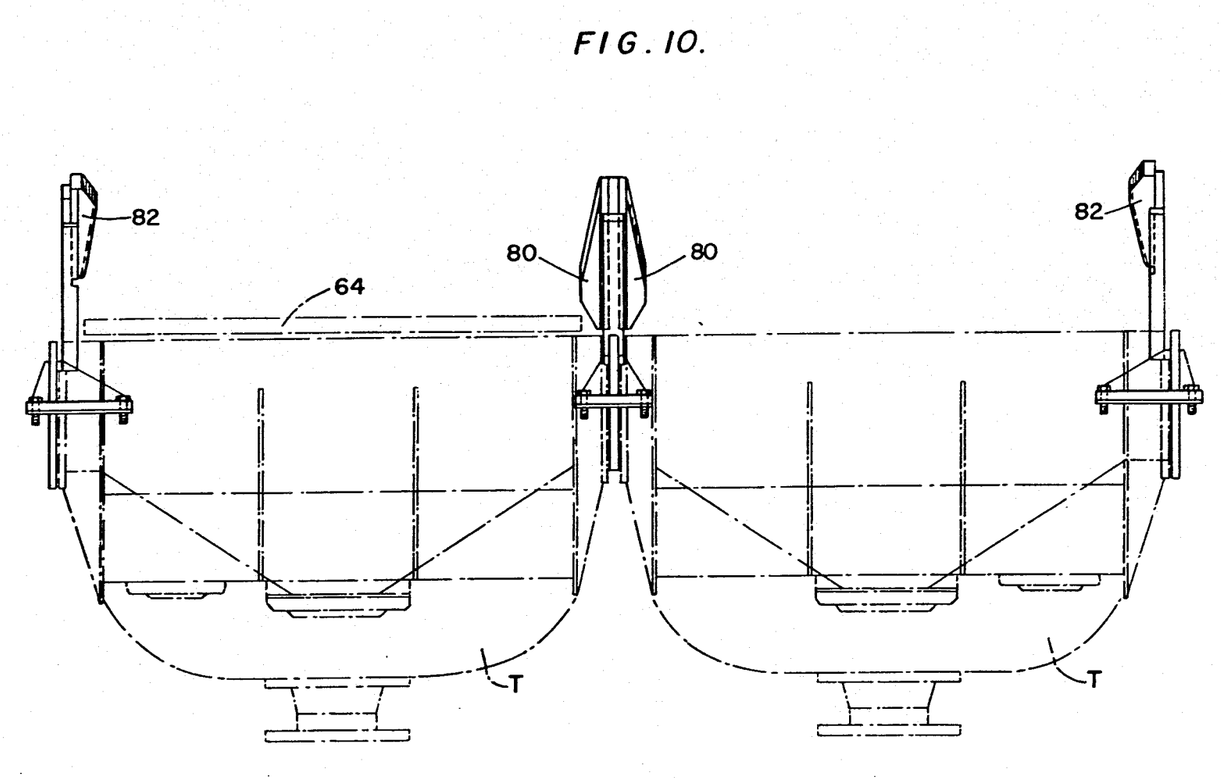
FIG. 10 is an end view in elevation of the parts illustrated in FIG. 9

Each platen 36, as best seen in FIGS. 5–7, is provided with a valve arrangement including a distributor plate 54 with sets of openings 56, 58 and 60 therein. The distributor plates 54 are secured to platens 36 between the platens 36 and molding dies 42 so that openings 56, 58 and 60 provide communication between the molding dies 42 and passages 28. As seen in FIGS. 5 and 7, the distributor plate 54 is formed with three sets of openings 56, 58 and 60 with each set being adapted to provide communication for each of three molding dies 42. Opening 56 of each set of openings is provided with a slide valve 62 adapted to be moved between open and close positions by an operating rod 64. Valve 62 is supported for sliding movement on an apertured support plate 66 through which bifurcated flange portion 68 of valve 62 extends over operating rod 64 in straddle relationship and sandwiched within slot 70 of collar 72 of the operating rod 64. From the foregoing construction, it is seen that when valve 62 is in the extreme left position to expose the opening 56 suction from the stock tank is provided in the molding die 42 to form the molded article by communication with a vacuum source through the platen 36 and cylinder 12. Opening 56 may be closed when valve 62 is moved to the extreme right position by operating rod 64, with the latter being urged to the right, for example by cam means, at which time suction through opening 56 is precluded while suction continues through openings 58 and 60, which remain open. To urge operating rod 64 to the left or to the right cams 74 and 80 are secured on the stock tank, as seen in FIGS. 8–10. For purposes of adjusting the length of molding time or period through opening 56 an adjustable cam 74 is provided to act against one end of operating rod 64 to urge valve 62 to the left or open position. Adjustment of the position of cam 74 to alter the length of time opening 56 is open is accomplished by rotating crank 76 to advance or withdraw screw 78 on which adjustable cam 74 is supported. Fixed cam 80 is provided at the opposite side of the stock tank from adjustable cam 74 to urge operating rod 64 and valve 62 to close opening 56 so that no suction from the stock tank takes place in the associated portion of the forming die 42. In this way, localized formation may be controlled as to basis weight or thickness of a molded article, while other portions of the die may be subjected to further suction molding through openings 58 and 60, for example. In FIG. 8 P1 represents the trajectory of the operating rod 64 as each molding die 42 undergoes a forming cycle in the stock tank T. Looking at FIGS. 8 and 9 it will be seen that the forming cylinder 12 rotates in the direction of the arcuate arrow and considering FIG. 9 movement of the platen 36 is from right to left so that operating rod 64 and valve 62 are first closed by cam 80 and then opened by cam 74.

Where it is desired to operate the cylinder 12 in reverse for maintenance reasons, for example, a cam 82 is provided as a safety feature to insure that operating rod 64 is always in the correct relative position.

Figure 2:
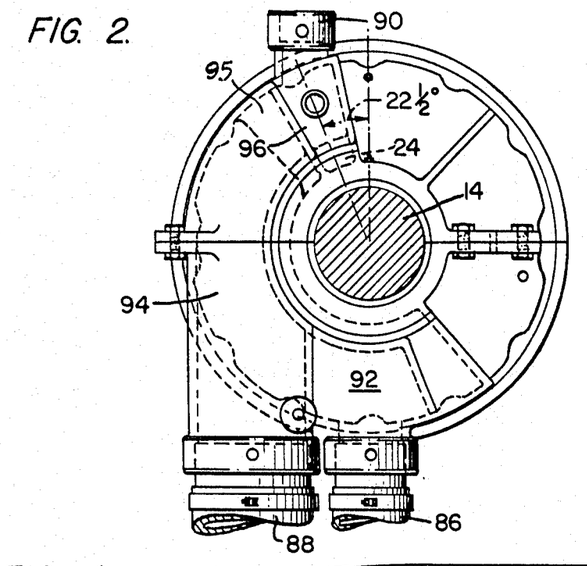
FIG. 2 is a view taken along the section line 2—2 in FIG. 1A.
Figure 4:
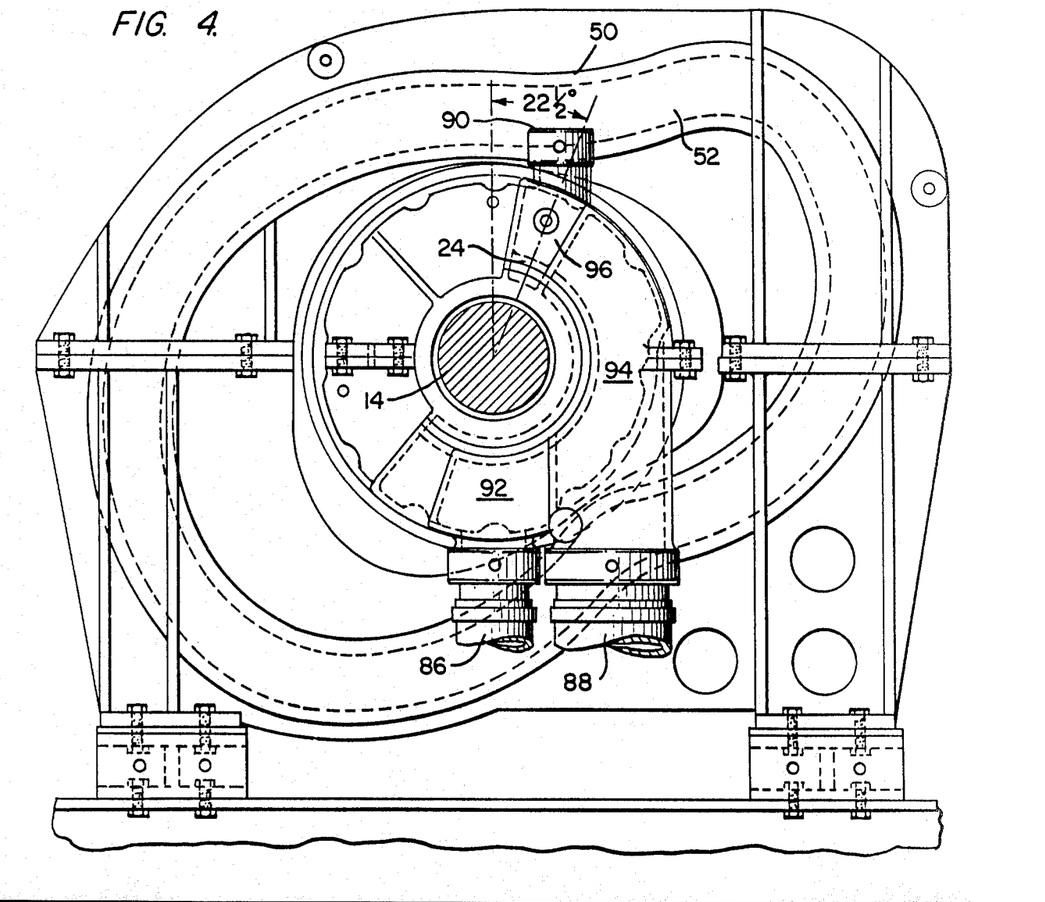
FIG. 4 is a view taken along the section line 4—4 in FIG. 1B.

Looking now at FIGS. 1A, 1B and 3 along with FIGS. 2 and 4, it is noted that a substantial mirror image arrangement of sets A and B of platen units 34 are assembled on cylinder 12 on opposite sides of partition 26 which forms a blind closure. As the platen units 34 illustrated in FIGS. 1A and 1B are passing through their forming cycle vacuum is supplied as indicated in the arcuate arrows to provide suction moving up from molding die 42, hollow shaft, passages 28 through chambers 22 and out axial opening 24. It is noted at this point that in conjunction with the forming cylinder 10, port valve control units 84 are provided at opposite ends thereof and which are fixedly supported on support beams 18. Each port valve control unit 84 is formed with arcuate ports 92 and 96 of which port 92 is for cyclical communication with two separate vacuum conduits 86 and 88 and port 96 is for cyclical communication with a pressurized air through a conduit 90. Port 92 includes an extension 94 above conduit 88. The vacuum supplied through conduits 86 and/or 88 which communicate with chamber 22 through port 92 when axial opening 24 moves into registration therewith whereby suction is supplied via chamber 22, passage 28 and through distributor plate 54 to molding dies 42 as controlled by valves 62. After the molding dies 42 have passed through their forming cycles and are out of the stock tank T vacuum continues to be supplied from conduits 86 and/or 88 which communicate with chamber 22 through extension 94 of arcuate port 92 as axial opening 24 moves in registration therewith. The vacuum supplied through conduits 86 and/or 88 operates to extract water from the article as a preliminary drying step when molding die 42 is out of stock tank T. After the axial opening 24 moves out of registration with respect to extension 94 of arcuate port 92, it moves into registration with a blanked-off portion 95 and then into registration with arcuate port 96 through which pressurized air may be supplied from a source not shown via conduit 90, port 96, opening 24, chamber 22, passage 28, through distributor plate 54 and into the molding dies 42 to transfer the article to a drying die, for example. When axial opening 24 moves out of registration with extension 94 of port 92, chamber 22 is subjected to residual vacuum, which is vented by check valve 98 as atmospheric pressure momentarily opens it.

MANNER OF OPERATION

It should now be clear that the apparatus according to the present invention may be operated to carry out a method of continuously form molded articles, in particular cartons of multiple basis weight or thickness when stock tanks T are supplied with slurry at level L, vacuum sources connected to conduits 86 and 88 are turned on, air pressure connected to conduit 90 is turned on, and sprocket or gear 20 is driven by power source operably connected thereto. Looking at FIGS. 3 and 8, it may be seen that as forming cylinder assembly 10 is rotated in the clockwise direction, as indicated by the arrow in FIG. 8, each platen unit 34 is sequentially moved so that platen 36 enters moves through and leaves stock tank T. Each platen unit 34, as described above, is provided with a rocker arm 44 extending from a rocker shaft 46 and having cam follower 48 constrained by a fixed cam 50 in groove 52 so that each platen 36 enters the stock tank T, moves across stock tank T during the forming time and leaves the tank T with its attitude controlled so as to be horizontal or nearly norizontal.

As each platen 36 enters stock tank T and during its travel through stock tank T, axial opening 24 enters into and is in registration with port 92 of port valve control unit 84 whereby vacuum is supplied through conduit 86, port 92, opening 24, chamber 22, passage 28, hollow pivot shaft 38, distributor plate 54, and into the various sections of molding die 42 to suck pulp or like material from stock tank T.

Formation of the article on the working surface of molding die 42 is characterized by the structure of the die and further by the controls imposed upon the effective vacuum applied to the die sections by valve 62, operating rod 64, cams 74 and 80. Notwithstanding the fact that vacuum is connected between port 92 and up to hollow pivot shaft 38 when platen 36 enters stock tank T, operating rod 64 is moved into contact at one end thereof with fixed cam 80 which thereupon urges slide valve 62 to a position closing opening 56 of distributor plate 54, which opening 56 leads to a section of molding die section 42 for molding the pocket section, while at the same time vacuum is transmitted through openings 58 and 60 to other sections of die 42 for flap and cover sections, respectively. As platen 36 progresses across stock tank T operating rod 64 is moved into contact at its opposite end with adjustable cam 74 which thereupon urges slide valve 62 to a position to expose vacuum through opening 56 of distributor plate 54 leading to one section of die 42 for molding the pocket section. Vacuum, of course, continues to be supplied to other sections of molding die 42 for the remaining time platen 36 travels across stock tank T. As the time at which valve 62 is to be open may be varied by adjusting the position of cam 74, it is clear that suction formation time in the die section effected may be varied so as to obtain a predetermined basis weight or thickness pulp accretion and taken together with the entire die assembly used, an article may be formed with multiple basis weight or thickness.

Continuing from the pulp forming or suction segment of the operation of forming cylinder 12, each platen 36 is moved out from stock tank T, at which time axial opening 24 continues in registration with port 92 and along extension 94 thereof where vacuum continues to be supplied from conduits 86 and/or 88 to effect extraction and drainage of moisture from the pulp formed on molding die 42. Thereafter, axial opening 24 moves out of registration with extension 94 and into registration with blanked-off portion 95, at which time residual vacuum is vented to atmosphere by valve 98. Then opening 24 moves into registration with port 96 so that pressurized air is supplied from conduit 90 to effect transfer of the formed carton to a drying die. The pressurized air is supplied at about 22½° from the upper vertical position of platen 34. It is noted here that valve 62 remains in the open position from the time it is opened by operating rod 64 coming into contact with cam 74 so that both vacuum from conduit 88 and pressurized air from conduit 90 may be transmitted to molding die 42 through opening 56 of distributor plate 54 as well as through openings 58 and 60. In continuing around past port 96, platen 36 moves with valve 62 in the open position until operating rod 64 strikes cam 80 which closes valve 62 once again to initiate a controlled vacuum operation for forming another molded article of multiple basis weight or thickness.

From the foregoing apparatus and method of operation thereof, it is seen that multiple formation time may be achieved on a single mold so that selectively "thin" or "thick" areas may be formed in a molded article. It is noted that while the apparatus as illustrated and described relate to producing articles with two different basis weight or the thickness, it is within the contemplation of the present invention to provide an apparatus and method for molding an article with two, three, four or more different bases of weight or thickness.

It is further within the contemplation of this invention to provide an apparatus and method whereby two or three or four or more different articles or different shapes and/or of different bases weight and/or thickness with different dies arranged, for example, in adjacent rows around the cylinder.

Although the invention has been described herein with particularity in connection with one illustrated form of the molding apparatus and method of use, it is to be clearly understood that the present invention has been made only by way of example and that numerous changes in details of construction may be resorted to without departing from the spirit and scope of the invention as hereafter claimed.

What is claimed is:

1. Apparatus for producing molded articles from pulp or foam stock material and of multiple basis weight or thickness, said apparatus comprising a movable forming assembly carrying at least one forming platen unit thereon, said platen unit having at least one compartmented molding die made up of a plurality of die sections attached thereto, said forming assembly being movable to carry said molding die into a stock tank, passage means in said forming assembly communicating with and connecting said molding die to means for supplying vacuum, distributor means disposed between said molding die and said passage means, said distributor means including at least two openings which lead to separate die sections of said molding die, a port valve control unit mounted adjacent one end of said passage means and operable to connect and disconnect said means for supplying vacuum to said passage means and to said molding die, said distributor means including a movable valve member cyclically opening and closing one of said openings whereby a reduced vacuum operation time in one of said die sections is effected when said molding die is carried into a stock tank and a comparable less basis weight build-up of stock is thus achieved in said one of said die sections, others of said at least two openings being open over the entire time said molding die is carried in a stock tank thereby allowing greater vacuum operation time in others of said die sections and effecting a comparably greater basis weight build-up of stock in said others of said die sections.

2. Apparatus as defined in claim 1 wherein said forming assembly includes bearing means pivotally supporting a hollow shaft, said platen unit is secured on said hollow shaft for pivotal movement therewith, and said hollow shaft forms an extension of said passage means and cooperates to connect said molding die to said means for supplying vacuum.

3. Apparatus as defined in claim 2 wherein said port valve control unit is further operable to connect and disconnect means for supplying air pressure to said molding die by way of said passage means, said hollow shaft, and said distributor means, said means for supplying air pressure being effective to enable transfer of molded articles from said molding die.

4. Apparatus as defined in claim 3 wherein said forming assembly is generally in the form of a rotating cylinder and is movable whereby said platen unit is periodically carried in and removed from a stock tank from which stock is sucked onto said molding die by vacuum applied to said molding die from said means for supplying vacuum.

5. Apparatus as defined in claim 4 wherein said movable valve member is shiftable to positions for opening and closing said one of said openings by a rod element operably connected thereto and movable with said platen unit, a fixed cam element disposed in the path of said rod element to urge said movable valve member to its closing position and an adjustable cam element disposed in the path of said rod element to urge said movable valve member to its opening position, said adjustable cam element being adjustable in position through a range to provide zero suction or formation time to full suction or formation time.

6. Apparatus as defined in claim 5 wherein said port valve control unit includes separate ports effective to sequentially connect and disconnect said means for supplying vacuum and said means for supplying air pressure to said hollow shaft, said distributor means, and said molding die, said ports being separated from each other by a blanked-off portion, said air pressure being effective to transfer molded articles from said molding die.

7. Apparatus as defined in claim 6 wherein said platen unit is provided with a rocker shaft and a rocker arm extending therefrom, said rocker arm having a follower in following relationship with a fixed cam groove whereby as said forming assembly is rotated said platen unit is directed as to its attitude depending upon the portion of the forming cycle said platen unit is in.

8. Apparatus as defined in claim 7 wherein said platen unit is directed by said cam groove and follower to a downwardly facing direction and maintained in an attitude generally parallel to the horizontal plane as it enters the stock tank, moves through its forming cycle, and leaves the stock tank.

9. Apparatus as defined in claim 8 wherein said platen unit is directed by said cam groove and follower to a radially outwardly facing direction to facilitate transfer of molded articles from said molding die as it is carried to a transfer position.

10. Apparatus as defined in claim 9 wherein said port valve control unit is provided with check valve means for venting residual vacuum trapped in said passage means which has moved from registration with one of said ports for supplying vacuum to said molding die, past said blanked-off portion, prior to registration with the other of said ports for supplying pressurized air to said molding die for transfer of molded articles therefrom.

11. In a molding apparatus for producing multiple basis weight pulp or foam articles, a compartmented molding die assembly comprising a plurality of die sections, each of said die sections being separated from another die section, screen means disposed over said die sections, separate chambers connecting said die sections to means for supplying vacuum whereby pulp or foam may be sucked onto said die sections and means in one of said chambers being effective to control the amount of pulp or foam sucked onto one of said die sections so as to be at a reduced basis weight, a first one of said die sections being adapted to form the pocket section of an egg carton which includes many surfaces intersecting at various angles and being connected to said means for supplying vacuum to said one of said chambers having said means therein to control the amount of slurry at a reduced basis weight, and said means effective to control the amount of pulp or foam at a reduced basis weight in said one of said chambers is a valve member operable to close off said means for supplying vacuum while others of said chambers remain open to said means for supplying vacuum.

12. The die assembly as defined in claim 11 a second one of said die sections is adapted to form the cover section of an egg carton and a third one of said die sections is adapted to form the lock flap for an egg carton with the chambers connecting said second and said third ones of said die sections to the means for supplying vacuum so as to form cover sections and lock flap sections at a greater weight basis compared to that of pocket sections formed by said die assembly.

* * * * *